T. H. GERRARD.
CLUTCH.
APPLICATION FILED APR. 10, 1908.
940,002.
Patented Nov. 16, 1909.
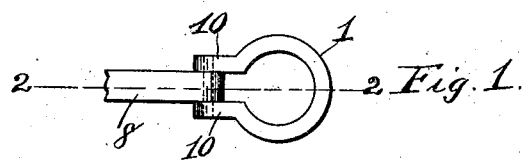
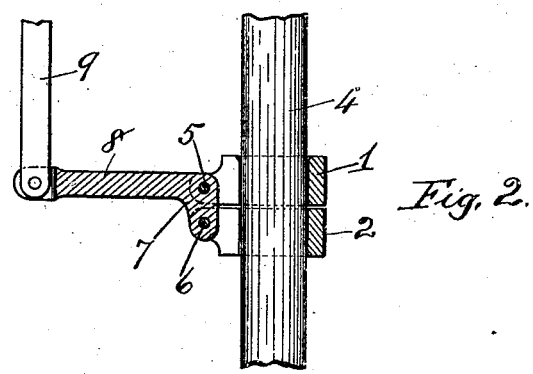
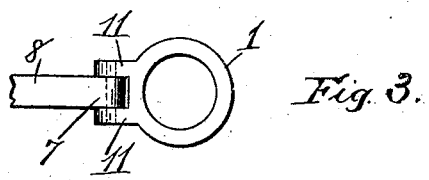
Witnesses:
J. Donsbach
G. Manning
Inventor:
Thomas H. Gerrard
By Mosher & Curtis
Attys.

UNITED STATES PATENT OFFICE.

THOMAS H. GERRARD, OF TROY, NEW YORK, ASSIGNOR OF ONE-HALF TO EDMOND A. MICHON, OF TROY, NEW YORK.

CLUTCH.

940,002.  Specification of Letters Patent.  Patented Nov. 16, 1909.

Application filed April 10, 1908. Serial No. 426,389.

*To all whom it may concern:*

Be it known that I, THOMAS H. GERRARD, a citizen of the United States, residing at Troy, county of Rensselaer, and State of New York, have invented certain new and useful Improvements in Clutches, of which the following is a specification.

The invention relates to such improvements and consists of the novel construction and combination of parts hereinafter described and subsequently claimed.

Reference may be had to the accompanying drawings, and the reference characters marked thereon, which form a part of this specification.

Similar characters refer to similar parts in the several figures therein.

Figure 1 of the drawings is a top plan view of my improved clutch. Fig. 2 is a vertical section of the same taken on the broken line 2—2 in Fig. 1, showing the clutch applied to a sliding member. Fig. 3 is a top plan view of a modified form of clutch embodying my invention.

The principal object of the invention is to control at certain times the movement of a sliding member.

The invention is applicable to various devices wherein sliding members are employed, and wherein it is desired to control the movements of such a sliding member at certain times, and to permit the same to slide at certain other times.

Referring to the drawings, wherein the invention is shown in preferred form, 1 and 2, are sleeves or rings, each being in the form of either a split sleeve, as shown in Fig. 1, or a closed sleeve, as shown in Fig. 3, in either case being adapted to freely receive a sliding member 4. The sleeves or rings, 1—2, are of substantially the same internal diameter, which is slightly more than the diameter of the sliding member, 4, so that when the two rings or sleeves, 1—2, are held in direct line, one above the other, the sliding member, 4, will be permitted to slip or slide freely through both rings. The clutch members, 1 and 2, are connected by the respective pivots, 5 and 6, with an anglelever, 7, having an operating arm, 8, said lever being adapted to work in a plane radial to the rings or sleeves 1—2. The operating arm, 8, can be controlled by a link-connection, 9, with any suitable mechanism, or may be operated by hand.

When a lifting force is applied to the operating arm, 8, the clutch-members, 1 and 2, will be forced in opposite directions into engagement with the sliding member, 4, the sleeve, 1, being pushed against one side of the sliding member, while the sleeve, 2, is pulled against the opposite side thereof. When the sleeves, 1—2, are thus forced against the opposite sides of the sliding member, they, together grip or clutch said sliding member, and prevent the same from slipping or sliding relatively to the clutch, but, as soon as the lifting force is withdrawn from the operating arm, 8, of the lever, the sliding member, 4, is relieved from the control of the clutch, and permitted to slide downward by gravity.

I do not wish to be limited to any particular use of the clutch above described, as the same is applicable for use in many situations.

In the construction shown in Figs. 1 and 2, each of the split sleeves terminates in a pair of ears, 10, and the lever, 7, is inserted between and pivotally connected with each of said pair of ears.

In the construction shown in Fig. 3, the ears, 11, project from the solid ring or sleeve.

As illustrating certain uses of my invention, the rod 4 may be a carbon in an arclamp, and the link-connection 9 may be a link connecting with the armature of an electro-magnet in such arc-lamp, as is fully understood by those skilled in the art; or the rod 4 may be the post or spindle of a lifting jack, and the link 9 a lifting member therefor.

What I claim as new and desire to secure by Letters Patent is—

A clutch for sliding members comprising a pair of clutch-members located in different horizontal planes and adapted to receive the sliding members and to shearingly engage the opposite sides thereof, an angle-lever having a vertical arm pivotally connected with both of said clutch-members, and a lifting member positively connected directly with a horizontal arm of said lever and constituting the sole support for said lever and said clutch-members.

In testimony whereof, I have hereunto set my hand this 30th day of March, 1908.

THOMAS H. GERRARD.

Witnesses:
FRANK C. CURTIS,
J. DONSBACH.